United States Patent [19]
Dalton

[11] Patent Number: 4,667,694
[45] Date of Patent: May 26, 1987

[54] SAFETY VALVE FOR COMPRESSED LIQUID GAS

[76] Inventor: Charles R. Dalton, 23 Promenade, Irvine, Calif. 92715

[21] Appl. No.: 771,507

[22] Filed: Aug. 30, 1985

[51] Int. Cl.[4] ............................................. F16K 21/18
[52] U.S. Cl. ..................................... 137/154; 137/386
[58] Field of Search .................... 137/1, 12, 59, 60, 61, 137/62, 65, 66, 78.4, 79, 80, 101.25, 170.2, 198, 199, 200, 201, 213, 214, 301, 351, 386, 390, 453, 454, 457, 468, 556, 556.3, 556.6, 558; 141/1, 5, 40, 46, 197, 209, 217

[56] References Cited

U.S. PATENT DOCUMENTS

| | | | |
|---|---|---|---|
| 1,848,031 | 3/1932 | Spencer | 137/468 X |
| 3,812,888 | 5/1974 | Dalton | 137/101.25 X |
| 4,191,208 | 3/1980 | Mylander | 137/393 |
| 4,208,994 | 6/1980 | Kitamura | 137/468 X |

Primary Examiner—Stephen Marcus
Assistant Examiner—Mark Thronson
Attorney, Agent, or Firm—Singer & Singer

[57] ABSTRACT

A safety valve for compressed liquid gas fuel tanks that has no man-movable parts and is completely automatic during the filling procedure. A movable piston within the valve body is responsive to pressure developing within an expansion chamber. The expansion chamber is connected to a 20% valve associated with the fuel tank and when liquid gas is detected the liquid expands and cools causing a thermal operated valve to transfer. Transferring of the thermal valve closes a port and prevents venting of the expansion chamber. Pressure building up in the expansion chamber causes the piston to automatically move, thereby shutting off the flow of fuel from the supply to the fuel tank. The filling procedure when restarted, after the thermal valve has warmed up sufficiently to return to its normal state, allows the pressure in the supply tank to transfer the piston and again allows fuel to enter the fuel tank, thereby preventing the operator from over-filling the fuel tank with compressed liquid gas and subsequent rupture of the vessel due to liquid expansion.

8 Claims, 9 Drawing Figures

PRIOR ART Fig. 1.
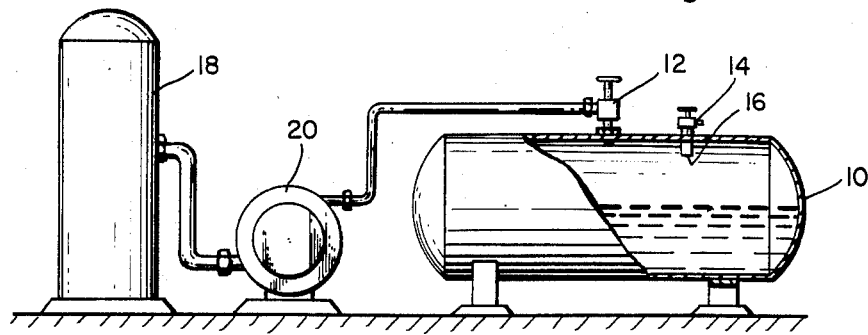
Fig. 2.
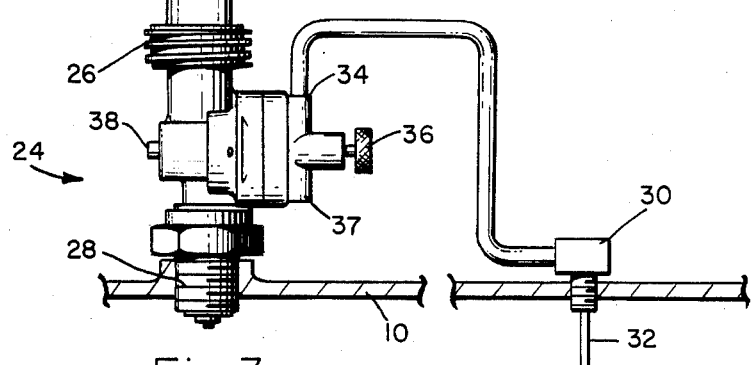
Fig. 3.
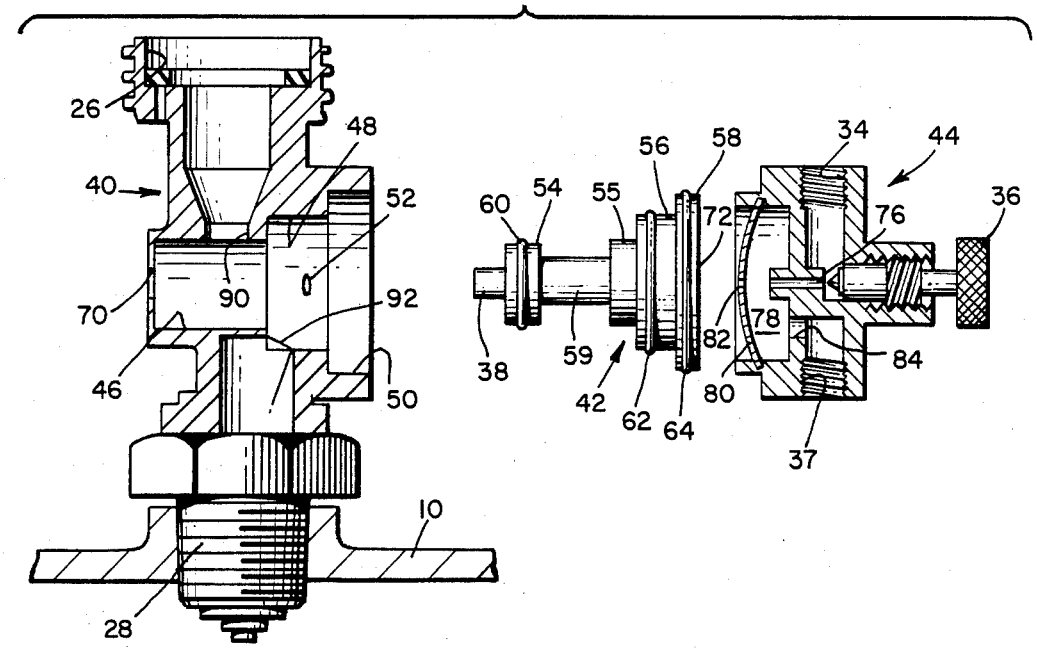

SAFETY VALVE FOR COMPRESSED LIQUID GAS

This invention relates to a compressed liquid gas safety valve for automatically preventing filling a compressed liquid gas fuel tank to more than a predetermined volume.

Compressed liquid gas does not exist in nature in the liquid state but rather must be manufactured or compressed into a liquid. There are basically three kinds of compressed gases in use today, and they include liquid petroleum gas, commonly known as LPG, liquid natural gas, commonly known as LNG, and compressed natural gas, commonly known as CNG. All three gases are compressed and stored under pressure; however, only LPG and LNG are stored as a liquid under pressure. The compressed natural gas (CNG) is normally stored under at least 2,000 pounds per square inch pressure and is always stored as a gas and never as a liquid.

The present invention is concerned primarily with the automatic handling of compressed liquid gases of the LPG or LNG type. Reference to compressed liquid gas is intended to include all compressed gases stored under presure as a liquid.

Propane and Butane are part of the LPG gas family and are also known as LP gas. The initials LPG refer to liquified petroleum gas which is produced as one of the many byproducts of the refining of petroleum. LPG is produced by either "stripping" heavy products from natural gas or from refineries where crude oil is refined into gasoline, kerosene, diesel fuel and other petroleum products. LPG is a natural product of this refining process. Propanes and Butanes are a part of the LPG family which are also commonly known as bottled gas or tank gas.

Propanes and Butanes are basically a colorless, odorless liquid that will remain in a liquid state as long as it is under pressure. For commercial applications an odorant is normally added to the liquid petroleum gas in order to give the user an indication of the presence of the gas. Propane and Butane (LPG) heat of vaporization is approximately $-44°$ C. below which no further boiling or vaporization will take place. LPG has a direct relationship of volume of the liquid to pressure. When released to atmospheric pressure, the liquid will absorb heat in order to vaporize to meet the pressure and temperature characteristis of the LPG at those specific atmospheric conditions. For this change in state from liquid to vapor, energy in the form of heat is absorbed, thus lowering the temperature to approximately $-44°$ C. of the liquid and its surrounding media. This drop in temperature can be utilized to produce mechanical motion in Bi Metal elements.

For combustion engine applications, the completely vaporized LPG when entering the carburetor assures an even gas/air mixture to all cylinders. For cooking and heating a highly efficient source of energy is available from the burning of vaporized LPG.

Unfortunately, the low boiling point of LPG creates a problem in holding the liquid gas in the fuel tank. Normally the LPG fuel tank is designed and constructed to hold a specific volume of LPG at a pressure of approximately 250 pounds per square inch. In view of the low boiling point of LPG and the fact that LPG fuel tanks holding the gas under pressure is subjected to external ambient temperatures that may exceed 100° F., it can be appreciated that liquid LPG restricted in volume within the fuel tank will expand rapidly as the temperature increases, thereby increasing the internal pressure to a point far greater than the safe limits of the tank.

Conventional safeguards require that all LPG fuel tanks be designed and constructed and tested to withstand at least 500 pounds of static pressure which is approximately 3½ to four times the relief valve setting. In addition, all LPG tanks are required to have a pressure overload control valve (POC) which is sometimes in combination with the feed valve for automatically releasing excess pressure from within the gas tank. An additional safeguard is the requirement that LPG fuel tanks only be filled to 80 percent of their volume capacity in order to thereby allow 20 percent of the volume of the gas tank for expansion purposes as the ambient temperature rises.

The so-called 20 percent valve is an external valve communicating inside the LPG fuel tank with a vapor liquid level tube that is inserted a predetermined distance into the gas tank to represent 20 percent of the internal volume. The opening through the walls of the fuel tank is approximately the size of a No. 54 drill to thereby ensure that in the event of an accident that the only fuel that would escape to atmosphere would be through the small 54 drill-size opening. During the filling operation the 20 percent valve is opened, thereby allowing vapor within the gas tank to escape through the liquid level tube, indicating to the operator that the liquid level tube is in the presence of vapor only.

Filling the LPG tank with liquid gas raises the level of the liquid within the fuel tank until the liquid level reaches the liquid level tube. At that point the internal pressure within the tank forces a small portion of liquid LPG up the liquid level tube and out the external 20 percent valve. The LPG in the liquid state when released to atmosphere pressures immediately vaporizes causing a lower air temperature resulting in a heavy white fog indicating to the operator that the liquid level within the tank has reached the 80 percent portion. The operator then immediately shuts off the fuel pump, closes the 20 percent valve and closes the fill valve on the fuel hose to the LPG fuel tank.

The present invention concerns an improved safety valve used in connection with filling compressed gas fuel tanks that represent an improvement over valves presently used in the art today.

In the prior art the best example of an automatic safety valve for filling compressed gas fuel tanks is U.S. Pat. No. 3,812,888, issued May 28, 1974, entitled Compressed Liquid Gas Filling System and issued to the same inventor as the present invention, namely Charles Robert Dalton.

This prior art patent represented an advancement in the state-of-the-art and utilized a bi-metal thermal operated element for controlling a conventional valve used in combination with filling a compressed gas fuel tank.

This prior art device met with commercial success and represented substantially the first practical approach to an automatic fuel shut-off system for use with compressed fuel gas tanks. However, a need has developed for a completely integrated safety valve that would be immediately responsive to filling a fuel tank above the 80 percent level.

The present invention contemplates a new and novel integrated safety valve that in the first embodiment is responsive immediately to the filling of the fuel tank above the 80 percent level and is immediately controlled by pressure developed within the tank itself, thereby forcibly and directly stopping the flow of liquid from the supply tank to the fuel tank. In a preferred embodiment it is also possible for an indication to be given indicating to the operator when the valve has changed position (such as open to closed) since the system is completely automatic and requires no operation or control by the operator.

The safety valve comprises a valve body having a first port and a second port and a movable piston located in the valve body for controlling the passage of fluid from the first port to the second port.

The piston contains a first position for allowing passage of fluid from the first port to the second port and a second position which obstructs the flow of the fluid from the first port to the second port.

The valve body contains an expansion chamber which communicates with the head of the piston and when pressurized is capable of moving the piston from the first position (open) to the second (closed) position.

The expansion chamber also contains a third port that is adapted to be connected to the liquid overflow valve also called the 20 percent valve. A fourth port is also connected to the expansion chamber and is used to vent the expansion chamber to the atmospheric pressure.

A thermal operated valve having two positions is locate in the expansion chamber and in one position (cold position) obstructs passageway through the fourth port to outside atmosphere and in the second position (ambient temperature) vents the expansion chamber through the fourth port to the atmosphere.

In operation, vented gas at ambient temperature from the 20 percent valve flows through the third port into the expansion chamber around the thermal responsive valve and out the fourth port to the atmosphere. As soon as liquid reaches the liquid level tube, liquid LPG then flows through the tube and into the expansion chamber, where expansion lowers the temperature of the chamber to $-44°$ C., resulting in the immediate cooling of the thermal responsive element.

Once the thermal responsive valve cools it transfers to the second position, thereby obstructing passage of the fourth port to the atmosphere and causes pressure from the fuel tank to build up in the expansion chamber. This increased pressure operates against the movable piston causing the transfer of the movable piston to the second position (closed), thereby immediately and positively interrupting the flow of fuel from the supply source to the fuel tank.

In one of the embodiments a flag is attached to the movable piston indicating to the operator that the piston has transferred and that fuel is no longer flowing into the fuel tank. The operator then closes the source of fuel, disconnects the supply hose, and closes the vent from the 20 percent valve.

The liquid fuel flow shutoff is completely automatic and may be handled by relatively inexperienced personnel since all of the safety features are included in the one valve which is positively operated by the pressure building up in the fuel tank itself as a result of the liquid fuel reaching the 80 percent full level.

Further objects and advantages will be made more apparent by referring now to the accompanying drawings wherein:

FIG. 1 is a block diagram of a conventional system for filling compressed liquid gas fuel tanks;

FIG. 2 is a view illustrating the safety valve installed in a conventional fuel tank;

FIG. 3 is an exploded view of the safety valve illustrated in FIG. 2;

Figure 4:
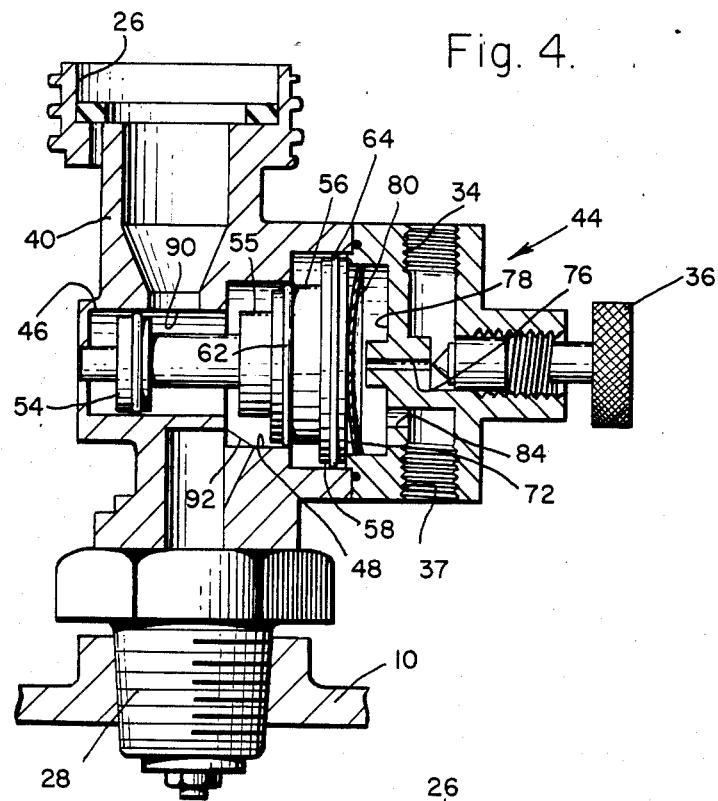
FIG. 4 is a cross-sectional view of the safety valve of FIG. 2 illustrating the thermal valve in a first position.

Referring now to FIG. 1, there is shown a diagram illustrating the prior art techniques for filling a compressed liquid gas fuel tank 10. Located on one side of the fuel tank 10 and preferably on the uppermost side is a liquid fill valve 12 and a 20 percent valve 14. A liquid level tube 16 projects within the fuel tank 10 a distance equal to 20 percent of the total volume of the tank. The upper end of the liquid level tube 16 is connected to the manual controllable 20 percent valve 14.

The compressed liquid gas supply is normally maintained in substantially large fuel tanks 18 under pressure. A fuel pump 20 is used to connect the output from the fuel tank 18 into the liquid fill valve 12 associated with the LP fuel tank 10.

In normal filling operation the connection is made as illustrated in FIG. 1 with the liquid fill valve 12 opened and the 20 percent valve 14 opened. The pump 20 forces liquid gas under pressure from tank 18 into tank 10. As the liquid level within the tank 10 rises beyond the 80 percent level, a portion of the liquid will enter the liquid level tube 16 and be forced out the 20 percent valve 14. The operator by necessity must stand near the tank being filled in order to observe the white foamy material which indicates that liquid is being vaporized in the atmosphere as it emerges from the 20 percent valve 14. The operator then stops the pump 20, closes the 20 percent valve 14 and the liquid fill valve 12, and removes the coupling between the pump 20 and the valve 12. At this point the fuel tank 10 is now filled to within 80 percent of the volume capacity leaving 20 percent of the volume for vapor expansion as the ambient temperature changes.

From the foregoing description of the prior art techniques it can be appreciated that it is left entirely up to an operator who must remain in close proximity to the filling of the tank in order to prevent overfilling. This requirement places a severe restriction on the commercial applicability and use of compressed liquid gas systems for automotive, heating, cooking, or other LPG systems that require a tank filling process.

The present invention is concerned primarily with replacing valve 12 illustrated in FIG. 1 with a new and improved safety valve 24 illustrated in FIG. 2. The valve 24 is inserted in the fuel tank 10 as a replacement for valve 12 illustrated in FIG. 1, or elsewhere in the LPG supply line. One end of the valve 24 identified as port 26 is connected by a suitable line to a pump 20 for forcing the liquid LPG fuel into the tank 10. A port 28 located on the opposite end of the valve 24 is connected to the fuel tank 10.

A 20% valve 30 contains a suitable probe 32 which is inserted within the fuel tank 10 a distance equivalent to 20% of the volume of the fuel tank. The 20% valve 30 is connected to another port 34 associated with the valve 24. A needle valve 36 performs the same function as the needle valve associated with the old 20% valve 14 illustrated in FIG. 2. In this case the needle valve 36 controls the flow of liquid from the 20% valve 30 into the main valve 24. A port 37 located opposite port 34 is open to atmosphere.

A suitably colored plunger 38 is attached to a piston located within the valve 24 and when exposed as illustrated in FIG. 2 indicates to the observer that the valve is closed and fuel cannot be pumped into the fuel tank. Typically the end 38 will be painted red to serve as a warning that the valve has tripped.

Referring now to FIG. 3 there is shown a partial cross-section and exploded view of valve 24 illustrated in FIG. 2. The valve 24 is composed basically of three parts consisting of a main body portion 40 that is shown physically connected to the fuel tank 10, a piston portion 42 adapted to fit within a recess located in the body portion 40, and a cover portion 44 which is secured to the body portion 40 and thereby seals the piston 42 in place within the valve body.

The body portion 40 contains port 26 at one end connected to a suitable pump and a port 28 at the other end connected to the fuel tank. In operation the fuel is inserted into port 26 and is exited from port 28 into the tank. Located in the central portion of the body 40 is a three tiered cylinder section having a first diameter at 46, a second larger diameter at 48, and a still larger diameter at 50. Located on diameter 48 is a weep hole 52 that vents that portion of the cylinder 48 to atmospheric pressure.

The piston 42, that will move within cylinder sections 46, 48 and 50, has six major diameters 38, 54, 59, 55, 56 and 58. Piston 42 has diameters 54, 56 and 58 that correspond with the cylinder mating surfaces 46, 48 and 50, and each have a pressure tight seal with these surfaces. In the first embodiment an O-ring 60 is located on diameter 54, an O-ring 62 is located on diameter 56, and an O-ring 64 is located on diameter 58.

Diameter 38 is adapted to project through an opening 70 located on the main housing 40. When the piston 42 is moved in the furthest operating position into the cylinder 40 the projection of diameter 38 indicates to the observer that the valve has been operated or tripped in the "closed" position. Diameter 54 with O-ring 60 prevents the escape of pressurized LPG to atmosphere through opening 70.

Reduced diameter 59 allows LPG to flow freely through valve assembly 40 when the piston is in the valve "open" position. Diameter 55 forms the valve plug that when seated in the closed position of the piston 42 seals the exit port 28 thus preventing flow of LPG through the valve body 40. Diameter 56 is the smaller diameter piston, while diameter 58 is the larger diameter piston on the same shaft. Weep hole 52 maintains atmospheric pressure between these two piston diameters.

The force imposed by a piston is a function of the area in square inches multiplied by the pressure imposed in pounds per square inch. If the same pressure is applied to the piston area of both the large diameter and small diameter pistons, and the back of each piston is at atmospheric pressure, a greater force will develop on the larger area piston than on the smaller area piston. When each piston area is exposed to the same LPG pressure from the LPG tank 10 and filling pump 20, and the back of each piston is at atmospheric pressure through weep hole 52, the larger diameter piston 58 has greater mechanical force, causing the piston assembly 42 to move toward the closed position.

At the junction of cover 44 and the valve body 40 a means of sealing the internal pressure from external atmospheric pressure is introduced. The cover 44 is securely attached to the body 40. The valve cover 44 contains port 37 at one end and port 36 at the other end. Located in the central portion of cover 44 is a needle valve 36 that is adapted to close and open the flow of fluid from port 34 through a restriction orifice 76. The opposite end of restriction orifice 76 communicates with an expansion chamber 78 located internally on that side of the cover 44 that communicates with the larger diameter piston area 58.

A thermal responsive valve in the form of a thermometal or a bi-metallic spring 80 having a circular cross-section is attached to the peripheral walls of the expansion chamber 78 and when in ambient temperature maintains the position as shown. Port 37 which is open to the atmosphere communicates with the expansion chamber 78 by means of a passageway 84.

Referring now to FIG. 4, there is shown a complete valve 24 in which the piston 42 is inserted within the valve body 40 and the cover 44 is in place over the piston and attached to the valve body.

FIG. 4 illustrates the valve in the normal configuration with port 26 connected to a suitable pump and port 28 connected to a fuel tank 10 and in which fuel is able to flow from port 26 through the valve body 40 and out port 28 into the fuel tank.

Located on cylinder wall 46 is a port 90 that communicates with port 26 and allows fluid to flow through the valve body and into the cylinder area between piston projections 54, 55 and 56.

Located on wall portion 48 is a port 92 that communicates with port 28 in the valve body 40 thereby allowing fluid to flow from port 26 through the valve body and out port 28.

In the normal filling condition as shown in FIG. 2, port 34 is connected to the 20% valve 30 and port 37 is open to the atmosphere. As the tank is being filled, LP gas detected by probe 32 within the fuel tank 10 will flow through the 20% valve 30 through port 34 through restriction orifice 76 and into the expansion chamber 78. The gas will simply flow through the expansion chamber and out passageway 84 and out port 37 which is open to the atmosphere. This process will continue until probe 32 associated with the 20% valve touches liquid gas.

The moment the probe 32 touches the liquid gas level within the fuel tank 10, liquid LP gas is fed from the probe through the 20% valve 30 through the port 34 through the connecting passageway 76 into the expansion chamber 78. The liquid when reaching the expansion chamber 78 will expand and cool the bi-metallic spring 80 causing the thermo disk to transfer and assume a new position as shown in FIG. 5.

Figure 5:
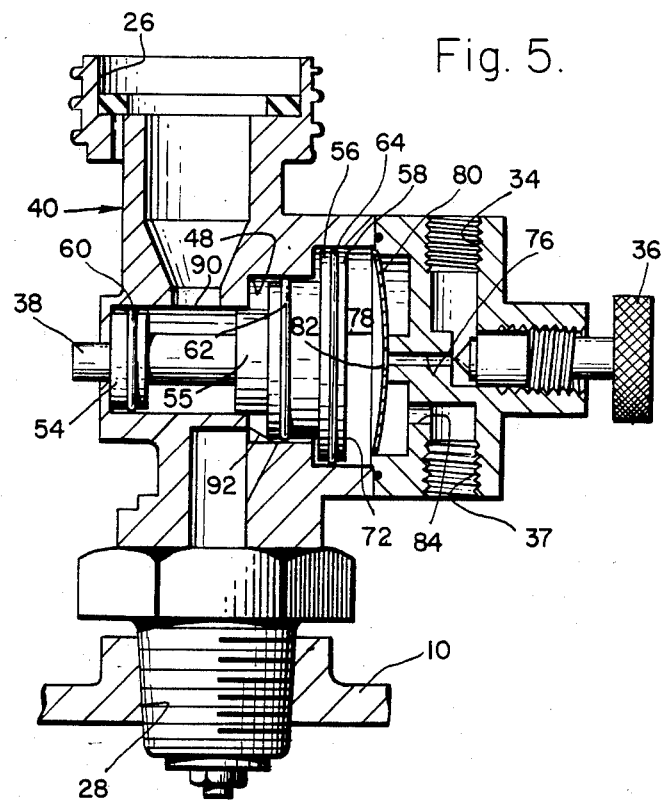
FIG. 5 is a cross-sectional view of the safety valve of FIG. 2 illustrating the thermal valve in a second position.

A review of FIG. 5 will show that thermal valve 80 is now illustrated in the transferred position which has the effect of blocking or sealing passageway 84 that connects the expansion chamber 78 with the atmosphere through port 37. The thermal valve is constructed with a central opening 85 that communicates with passageway 76 thereby allowing the thermal valve 80 to block passageway 84 but not affect passageway 76.

In this position the rising liquid in the fuel tank 10 forces liquid through the probe 32 associated with the 20% valve 30 into port 34 through passageway 76 into the expansion chamber 78. However, at this point the passageway to atmosphere is closed resulting in the chamber 78 being pressurized at the same pressure existing in the fuel tank 10. This increased pressure acting upon face 72 of piston 42 causes the piston to be moved in the direction as illustrated.

In the transferred position projection 38 is pushed through opening 70 located in the main housing 40. Piston diameter 54 together with O-ring 60 prevents any fluid entering port 26 from escaping through the opening 70 in housing 40. Piston diameter 55 is pushed within cylinder diameter 46 effectively sealing that portion of the cylinder and preventing any fluid from moving from port 26.

Diameter 56 of piston 42 contains O-ring 62 which effectively seals port 92 and the O-ring prevents any leakage of fluid resulting from the pressure within the fuel tank 10.

At this point reference is again made to FIG. 3 and the weep hole 52 located on the cylinder portion 48. This weep hole is located to the right of O-ring 62 and as illustrated the weep hole 52 is opened to atmospheric pressure. This allows the piston 42 to be pushed against atmospheric pressure after the thermal valve 80 is transferred.

In the position shown in FIG. 5, the valve has been operated since the piston 42 has been transferred from its first position to the second position and has effectively stopped the flow of fluid from port 26 through port 28. The projection 38 would indicate to the operator that the valve has operated and no more fuel is entering the fuel tank. At this point in time the operator would stop the pump, close needle valve 36 and disconnect the lines feeding the supply tank with the fuel tank through port 26. The piston 42 will stay transferred and effectively seal the fuel tank.

In time bi-metallic spring 80 will assume the position shown in FIG. 4 and nothing will happen until the fuel has been used from the fuel tank 10 and it is necessary to again fill the fuel tank.

At that point in time the operator simply connects port 26 to the pump as shown in FIGS. 2 and 3. The operator cracks the valve 36, thereby allowing vapor from the 20% valve 30 to enter port 34, pass through the expansion chamber 78 and out port 36. The operator starts the pump and the pressure from the pump entering port 26 and operating on the face of band 55 associated with the piston 42 will cause the piston to move outwardly and into an open position. At this point in time there is no pressure in the expansion chamber 78 and the piston is now free to move against atmospheric pressure. The process then repeats itself as the tank is filled and the probe 32 again detects liquid within the fuel tank 10.

Figure 8:
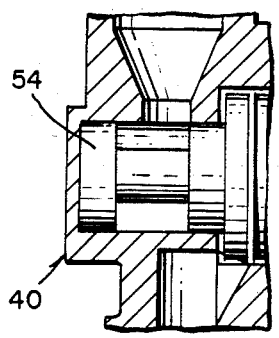
FIG. 8 illustrates another embodiment that eliminates the indicator and saves still another O-ring.
Figure 6:
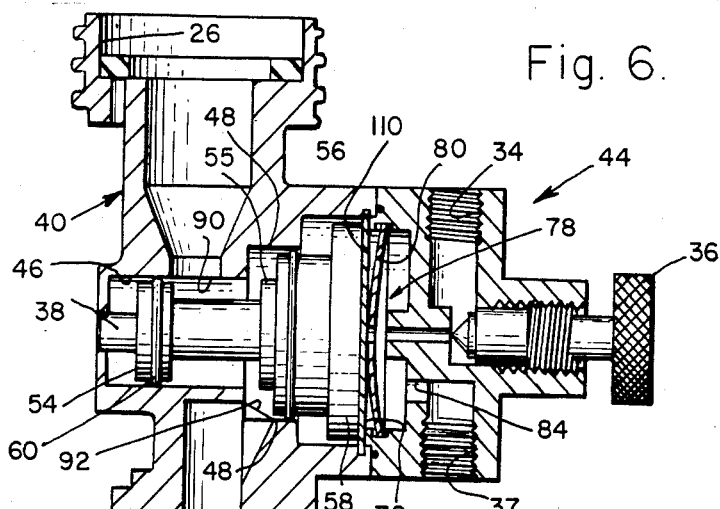
FIG. 6 illustrates a second embodiment of the safety valve having a diaphragm to replace an O-ring.
Figure 7:
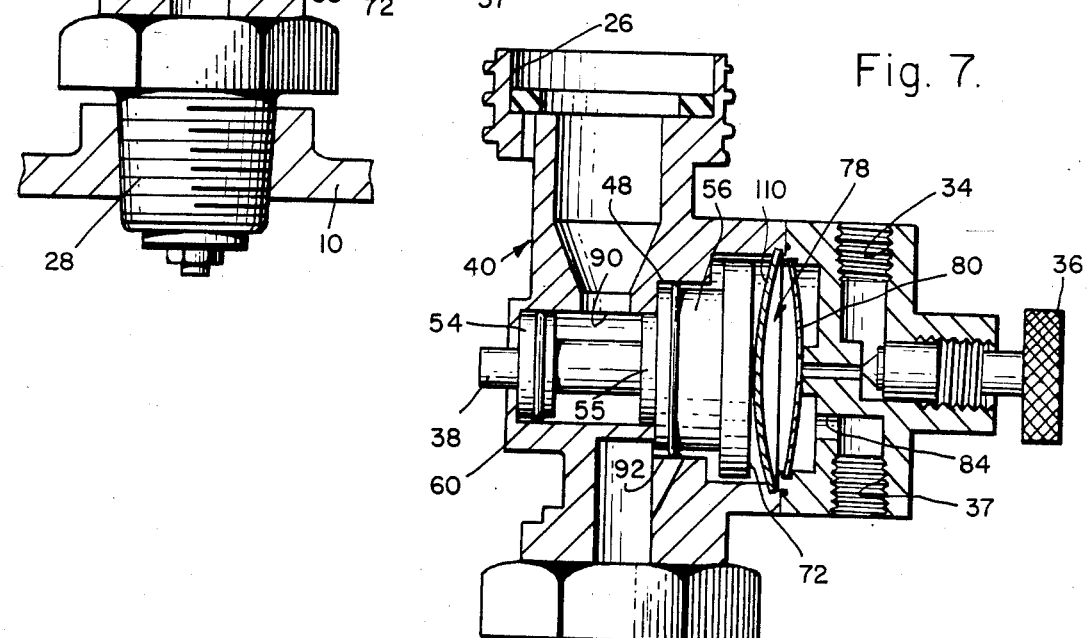
FIG. 7 illustrates the valve in FIG. 6 in the operated position.

In operation the safety valve has been very successful and in an effort to improve the efficiency of the valve and reduce the forces necessary to move the piston, there is described in FIGS. 6, 7 and 8, different embodiments that reduce the need for having three separate O-rings on the piston 42.

Referring now to FIG. 6, there is shown a diaphragm 110 connected across the face 72 of the piston 42 and attached to the peripheral portions of the valve body 40. The diaphragm 110 completely covers the face 72 of the piston and isolates the cylinder portion in which the piston rides from the expansion chamber 78. In this fashion the O-ring 64 illustrated in FIG. 3 is no longer needed since the diaphragm 110 completely isolates the cylinder portion from the expansion chamber. The operation of the valve is the same and the movement of the piston 42 is the same as illustrated in FIG. 7. Once the thermal valve 80 as shown in FIG. 7 has operated, the pressure built up within the expansion chamber 78 is forced against the diaphragm and the face 72 of the piston causing the piston 42 to move as previously described in connection with FIG. 5. The operation is completely the same; however, the elimination of O-ring 64 allows the piston 42 to move in a freer manner requiring less force and less tendency to bind.

Referring now to FIG. 8, there is shown still another embodiment in which O-ring 60 located on piston 54 has been eliminated. In this embodiment the casing or main valve body 40 is now sealed and closed, thereby removing the need for an opening 70 as shown in connection with FIG. 3. The projection 38 is removed and the piston 42 is free to move within the housing 40 and as a result of closing the casing and eliminating the opening 70 it is now possible to eliminate the O-ring 60 that was originally associated with band 54.

It will be appreciated tht the combination of the embodiment shown in FIG. 6 which involves the use of a diaphragm 110 eliminates the need of O-ring 64 and eliminating the indicator 38 and enclosing the housing 40 now allows the removal of O-ring 60.

The piston 42 can be inserted with only O-ring 62 needed and in this fashion friction caused by the O-rings is immeasurably reduced thereby allowing piston 42 to move in a free and easy manner.

Figure 9:
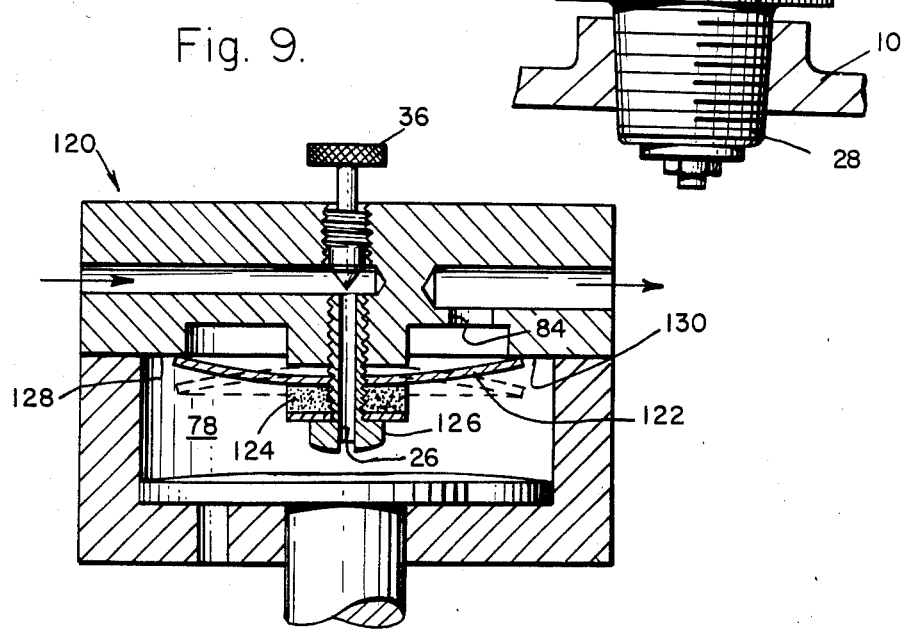
FIG. 9 illustrates a second embodiment for supporting the bi-metallic thermal disc in an axial position rather than along the periphery as shown in FIG. 3.

Referring now to FIG. 9, there is illustrated a modified cover portion 120 performing all the same functions as cover portion 44 illustrated in FIG. 3, with the exception that the thermal bi-metallic disc 122 is located axially with respect to needle valve 36.

The bi-metallic disc 122 is located coaxially with respect to orifice 76 and is held in place by a suitable spring washer 124 secured by a conventional machine screw with washer 126.

The bi-metallic disc 122 has a diameter of sufficient length to contact shoulder 128 located within the expansion chamber 78 at one end and to contact shoulder 130 on the other end so as to effectively seal passageway 84 and thereby effectively block the communication of the expansion chamber to atmosphere by sealing passageway 84 when in the transferred position.

The embodiment illustrated in FIG. 9 allows the bi-metallic disc 122 to flex and transfer its position radially from the axial position to the periphery, whereas in FIG. 3 the bi-metallic spring 80 is fixedly positioned along the periphery thereby resulting in the transferred motion to be coaxial along its axial center.

In operation the action is the same and it is envisioned that for certain applications it may be more desirous to mount the bi-metallic spring along its axial center and allow the sealing to take place along the periphery as shown in FIG. 9 or to mount the bi-metallic spring on the periphery and allow the sealing to take place on the axial portion of the spring.

I claim:
1. A system comprising:
   a valve body having a first port and a second port,
   a movable piston located in said valve body for controlling the passage of fluid from said first port to said second port,
   said piston having a first position for allowing passage between said first port to said second port and a second position for obstructing said passage, an expansion chamber communicating with said piston for moving said piston to said second position when said chamber is pressurized, a third port connected to said expansion chamber and adapted to be connected to a liquid overflow valve, a fourth port connected to said expansion chamber for venting gases from said expansion chamber, a thermal responsive valve located in said expansion chamber for obstructing passage to said fourth port, said thermal responsive valve having a first position for allowing passage through said fourth port and a second position for obstructing passage through said fourth port, and in which said first port is adapted to be connected to a supply of liquid gas under pressure and said second port is connected to a tank capable of being filled with liquid gas.

2. A system according to claim 1 in which said movable piston in said second position completely stops the flow of liquid gas from the supply to said tank being filled.

3. A system according to claim 2 in which said tank includes a 20% liquid overflow valve and in which said third port is connected to said 20% liquid overflow valve on said tank being filled.

4. A system according to claim 1 in which said fourth port is vented to atmosphere.

5. A system according to claim 1 in which said thermal responsive valve is a circular disc of temperature sensitive metal whereby cooling said valve causes said valve to assume said second position.

6. A system according to claim 5 in which said temperature sensitive metal valve has a central opening for allowing liquid fuel to enter said expansion chamber after said valve has assumed said second position.

7. A system according to claim 1 which includes a diaphragm completely covering said piston and thereby isolating said piston from said expansion chamber.

8. A system according to claim 1 which includes an indicia attached to one end of said piston and which is adapted to project through said valve body when said piston is caused to move from said first position to said second position.

* * * * *